Jan. 22, 1924.
E. R. BOLTON ET AL
1,481,678
ESTERIFICATION OF OILS
Filed Feb. 21, 1921
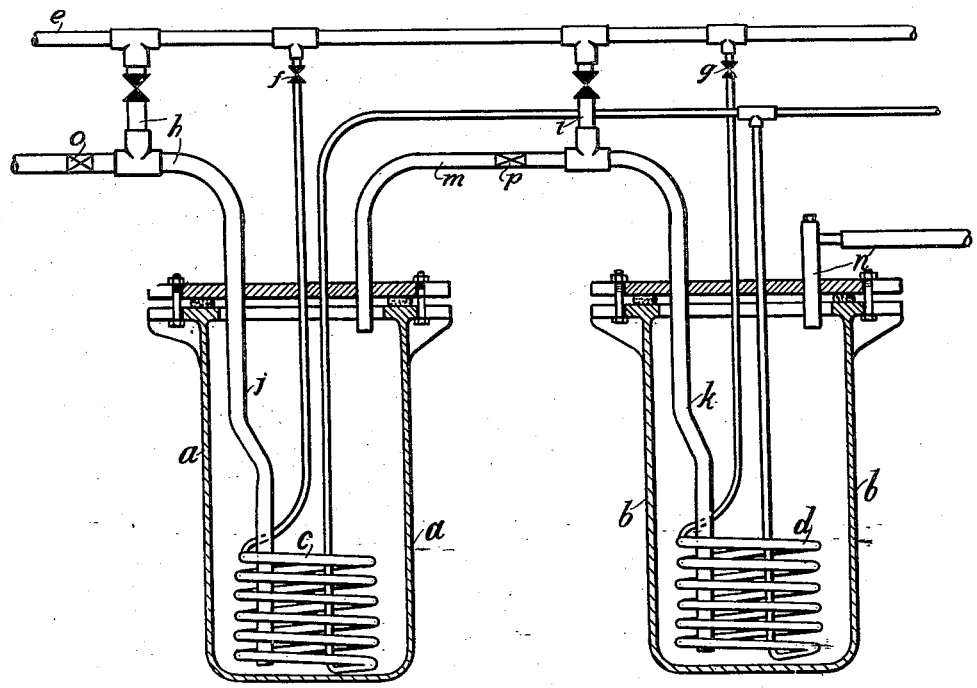
Inventors
E. R. Bolton and
E. J. Lush
by Wilkinson & Giusta
Attorneys.

Patented Jan. 22, 1924.

1,481,678

UNITED STATES PATENT OFFICE.

EDWARD RICHARDS BOLTON AND ERNEST JOSEPH LUSH, OF LONDON, ENGLAND, ASSIGNORS TO TECHNICAL RESEARCH WORKS, LIMITED, OF LONDON, ENGLAND.

ESTERIFICATION OF OILS.

Application filed February 21, 1921. Serial No. 446,866.

*To all whom it may concern:*

Be it known that we, EDWARD RICHARDS BOLTON and ERNEST JOSEPH LUSH, subjects of the King of Great Britain and Ireland, residing at London, England, have invented new and useful Improvements in the Esterification of Oils (for which I have filed application in England September 30, 1919, application No. 23,957), of which the following is a specification.

It is well known that the fatty acids such as oleic acid combine with glycerine with the production of glycerides, in which manner mono- di- triglycerides have been prepared.

For example oleic acid and palmitic acid have already been converted into olein and palmitin by heating such acids with a quantity of glycerine, while employing considerable time for effecting the des'.ed neutralization (esterification) this reaction being somewhat slow, on account of the accumulation of water in the mixture and the immiscibility of the two liquids.

The present invention relates to an improved process for producing glycerides characterized by the fact that such glycerides are produced in a comparatively short time and very economically, whereby the desired qualities of colour, taste and smell are assured in a more efficient manner than heretofore.

The method of procedure according to the present invention is as follows:—

The free fatty acids or the oil or fat containing free fatty acids as may be desired contained in a suitable receptacle, according to the use to be made of the finished product, are subjected to the action of glycerine vapours whereby chemical action takes place between the fatty acids and the glycerine vapours, resulting in the production of glycerides and water, which latter comes off as steam and must be removed, and any glycerine thus carried over may be recovered. The glycerine vapours are passed into the fatty acids or oil or fat containing free fatty acids, and the glycerine and oil may be in separate vessels. The admission and distribution of the glycerine vapour throughout the body of the fatty acids to be treated can be carried out in a variety of ways for example by the employment of a perforated coil of piping situated at or near the bottom of the vessel.

Or the glycerine may be vaporized by the oil or fat containing free fatty acids contained in the vessel, the contents of which are heated to a temperature above the boiling point of glycerine so that when the latter is introduced at or near the bottom, the vapour generated will rise through the oil contents and act on the free fatty acids producing glycerides. With this method of carrying out the process an addition of a small amount, say two per cent, of water to the glycerine will facilitate the production of the glycerine vapours, and dispense with the employment of superheated steam as is preferably used when the glycerine is vaporized in a separate vessel.

In connection with this process the use of vacuum is desirable as a much lower temperature is required for the distillation of glycerine, in consequence of which the percentage of decomposition of glycerine is reduced to a minimum.

In the annexed drawing is diagrammatically illustrated by way of example, a simple form of apparatus suitable for carrying out the process as first referred to in the above description in which the vessel $a$ represents the glycerine still and the vessel $b$ the receptacle for the oil to be subjected to the treatment. Both the vessels $a$ and $b$ are hermetically sealed by any convenient means and are provided with heating coils $c$ and $d$ that are supplied with superheated steam from the main supply $e$ regulated by the valves $f$ and $g$. Live steam which is also preferably superheated is admitted to the vessels $a$ and $b$ by the supply pipes $h$ and $i$ through the depending pipes $j$ and $k$ that may have affixed to their lower ends any form of distributor. The vessels $a$ and $b$ are connected together by means of the pipe $m$ so that they are both subjected to the action of a vacuum pump, with a condenser and receiver interposed between the vacuum pump and the vessel $b$, communication being established by the outlet pipe $n$ for the purpose of obtaining the necessary vacuum in the vessels $a$ and $b$, suitable non-return valves $o$ and $p$ being interposed in the pipes $h$ and $m$ therefor.

It will now be understood that the vaporized glycerine which may be obtained from crude glycerine placed in the vessel $a$ is carried over into the vessel $b$ by the pipe $m$ and is discharged at or near to the bottom of the vessel to mix in its rising with the oil in the said vessel b which oil is maintained at a temperature from at least 160° to 250° centigrade by the heating coil d. The vaporization of the glycerine is facilitated by the vacuum formed in the vessel a, and is effected by the steam supply to the heating coil c, of course assisted by the steam introduced through pipe j. Hence the process consists in the esterification of the oil contained in the vessel b by passing therethrough glycerine vapour formed in the vessel a. The process can be readily carried out so that no excess of glycerine is present in the oil treated thus avoiding the necessity of recovery thereof and by the aforesaid method much time is saved in obtaining the desired effect, for from experiments made we have found that it is possible to treat oil containing 50 per cent of free fatty acids satisfactorily within the period of one hour.

This invention is especially applicable to the treatment of oils where the presence of free fatty acids is objectionable, for example, as an operation preliminary to the hydrogenation of oils in processes where a neutral oil is required, or in such refining processes where considerable loss is incurred due to free fatty acids as for example in the refining of oils with an alkali for edible purposes or high grade soaps and the like or other purposes for which oil is refined. By combination with the requisite amount of glycerine vapour in the manner described the production of di- and mono-glycerides is readily obtained and in order to hasten the reaction any known form of catalyst may be employed but generally speaking we have found such an addition or accessory unnecessary.

What we claim is:—

1. A process of treating fatty oils which comprises heating an oil containing an undesirably large excess of free fatty acid, to a temperature of between 160 and 250° C., and while such oil is at said temperature, introducing thereinto, a current of vapor of glycerin mixed with steam, and continuing such treatment until a large fraction, at least, of the free fatty acid has been converted into glycerid of fatty acid.

2. A process of the converting free fatty acids alone or in the form of oils or fats containing free fatty acids, into glycerides which comprises heating a body of such substances containing free fatty acid to a temperature between about 160° centigrade and 250° centigrade, separately therefrom heating a body of glycerine and passing superheated steam through the same to form a mixture of glycerine vapor and water vapor, and leading such mixture of vapors into said body of fatty substances, and continuing said operation until a large fraction at least of the free fatty acid present has been converted into glycerids of fatty acids.

3. The process for the conversion of fatty acids or oils or fats containing free fatty acids into glycerides which consists in heating such substances preparatory to and during such conversion to a temperature of at least 160° centigrade but not exceeding 250° centigrade and subjecting the same to the action of glycerine vapour generated by superheated steam under vacuum.

4. The process for the conversion of fatty acids or oils or fats containing free fatty acids into glycerides which consists in heating such substances preparatory to and during such conversion to a temperature of at least 160° centigrade but not exceeding 250° centigrade and subjecting the same to the action of glycerine vapour with a suitable catalyst, said glycerine vapour being generated by superheated steam under vacuum.

In testimony whereof we have signed our names to this specification.

EDWARD RICHARDS BOLTON.
ERNEST JOSEPH LUSH.